US 8,069,151 B1

(12) United States Patent
Crafford et al.

(10) Patent No.: US 8,069,151 B1
(45) Date of Patent: Nov. 29, 2011

(54) SYSTEM AND METHOD FOR DETECTING INCONGRUOUS OR INCORRECT MEDIA IN A DATA RECOVERY PROCESS

(76) Inventors: Chris Crafford, Round Rock, TX (US); Daniel J. Gardner, St. Louis Park, MN (US)

( * ) Notice: Subject to any disclaimer, the term of this patent is extended or adjusted under 35 U.S.C. 154(b) by 1518 days.

(21) Appl. No.: 11/294,950

(22) Filed: Dec. 6, 2005

Related U.S. Application Data

(60) Provisional application No. 60/634,352, filed on Dec. 8, 2004.

(51) Int. Cl.
*G06F 17/30* (2006.01)
(52) U.S. Cl. .................................... 707/674; 711/162
(58) Field of Classification Search .............. 711/162
See application file for complete search history.

(56) References Cited

U.S. PATENT DOCUMENTS

| | | | |
|---|---|---|---|
| 5,107,419 A | 4/1992 | MacPhail | |
| 5,350,303 A | 9/1994 | Fox et al. | |
| 5,535,381 A | 7/1996 | Kopper | |
| 5,617,566 A | 4/1997 | Malcolm | |
| 5,689,699 A | 11/1997 | Howell et al. | |
| 5,717,913 A | 2/1998 | Driscoll | |
| 5,732,265 A | 3/1998 | Dewitt et al. | |
| 5,742,807 A | 4/1998 | Masinter | |
| 5,778,395 A | 7/1998 | Whiting et al. | |
| 5,813,009 A | 9/1998 | Johnson et al. | |
| 5,813,015 A | 9/1998 | Pascoe | |
| 5,884,298 A * | 3/1999 | Smith et al. .................. | 1/1 |
| 5,926,811 A | 7/1999 | Miller et al. | |
| 5,937,401 A | 8/1999 | Hillegas | |
| 5,982,370 A | 11/1999 | Kamper | |
| 6,023,710 A | 2/2000 | Steiner et al. | |
| 6,047,294 A | 4/2000 | Deshayes et al. | |
| 6,157,931 A | 12/2000 | Cane et al. | |
| 6,182,029 B1 | 1/2001 | Friedman | |
| 6,189,002 B1 | 2/2001 | Roitblat | |
| 6,199,067 B1 * | 3/2001 | Geller ............................ | 707/10 |
| 6,199,081 B1 | 3/2001 | Meyerzon et al. | |
| 6,216,123 B1 | 4/2001 | Robertson et al. | |
| 6,226,630 B1 | 5/2001 | Billmers | |
| 6,226,759 B1 | 5/2001 | Miller et al. | |

(Continued)

OTHER PUBLICATIONS

*Comparing IBM Tivoli Storage Manager and VERITAS NetBackup in Real-World Environments.* A summary by IBM of the whitepaper and benchmark written by Progressive Strategies, Nov. 8, 2002.

(Continued)

*Primary Examiner* — Jean B Fleurantin
*Assistant Examiner* — Anteneh Girma
(74) *Attorney, Agent, or Firm* — Berry & Associates P.C.

(57) ABSTRACT

Disclosed are embodiments of a system and method for detecting wrong storage media in data recovery processes. One embodiment can detect incorrect media via environmental factors such as source data type and format. One embodiment can detect incongruous media by pool membership. One embodiment can detect inappropriate media by comparing fingerprints. As each item is read, its fingerprint is calculated and compared to the overall fingerprint of a job. If the new fingerprint is different by some preset margin, a human inspector may be asked to validate the newly inserted storage medium. If valid, the overall signature for the job is revised to integrate the new signature. If not, the wrong medium is ejected and incorrectly loaded data is removed. Embodiments disclosed herein can detect the presence of a wrong medium quickly and early in a data recovery process, avoiding mistakes and saving time and costs.

15 Claims, 6 Drawing Sheets

U.S. PATENT DOCUMENTS

| | | | |
|---|---|---|---|
| 6,240,409 B1 | 5/2001 | Aiken | |
| 6,243,713 B1 | 6/2001 | Nelson et al. | 1/1 |
| 6,256,633 B1 | 7/2001 | Dharap | |
| 6,269,382 B1 | 7/2001 | Cabrera et al. | |
| 6,278,992 B1 | 8/2001 | Curtis et al. | |
| 6,324,548 B1 | 11/2001 | Sorenson | |
| 6,389,403 B1 | 5/2002 | Dorak | |
| 6,421,767 B1 | 7/2002 | Milillo et al. | |
| 6,477,544 B1 | 11/2002 | Bolosky et al. | |
| 6,493,711 B1 | 12/2002 | Jeffrey | |
| 6,662,198 B2 | 12/2003 | Satyanarayanan et al. | 1/1 |
| 6,708,165 B2 | 3/2004 | Jeffrey | |
| 6,745,197 B2 | 6/2004 | McDonald | |
| 6,751,628 B2 | 6/2004 | Coady | |
| 6,778,979 B2 | 8/2004 | Grefenstette et al. | |
| 6,810,395 B1 | 10/2004 | Bharat | |
| 6,834,110 B1 | 12/2004 | Marconcini et al. | |
| 6,859,800 B1 | 2/2005 | Roche et al. | |
| 6,915,435 B1 | 7/2005 | Merriam | |
| 6,928,526 B1 | 8/2005 | Zhu et al. | |
| 6,947,954 B2 | 9/2005 | Cohen et al. | |
| 6,954,750 B2 | 10/2005 | Bradford | 1/1 |
| 6,996,580 B2 | 2/2006 | Bae et al. | |
| 7,047,386 B1 | 5/2006 | Ngai et al. | |
| 7,089,286 B1 | 8/2006 | Malik | |
| 7,137,065 B1 | 11/2006 | Huang et al. | |
| 7,146,388 B2 | 12/2006 | Stakutis et al. | |
| 7,174,368 B2 | 2/2007 | Ross, Jr. | 709/207 |
| 7,260,568 B2 | 8/2007 | Zhang et al. | |
| 7,269,564 B1 | 9/2007 | Milsted et al. | |
| 7,284,191 B2 | 10/2007 | Grefenstette et al. | |
| 7,287,025 B2 | 10/2007 | Wen et al. | |
| 7,313,556 B2 | 12/2007 | Gallivan et al. | |
| 7,325,041 B2 | 1/2008 | Hara et al. | |
| 7,458,082 B1 | 11/2008 | Slaughter et al. | 719/328 |
| 7,526,478 B2 | 4/2009 | Friedman | |
| 7,533,291 B2 | 5/2009 | Lin | |
| 7,650,341 B1 | 1/2010 | Oratovsky et al. | |
| 2002/0002468 A1 | 1/2002 | Spagna et al. | |
| 2002/0019814 A1 | 2/2002 | Ganesan | |
| 2002/0038296 A1 | 3/2002 | Margolus et al. | |
| 2002/0059317 A1 | 5/2002 | Black et al. | |
| 2002/0107803 A1 | 8/2002 | Lisanke et al. | |
| 2002/0107877 A1 | 8/2002 | Whiting et al. | |
| 2002/0116402 A1 | 8/2002 | Luke | |
| 2002/0120925 A1 | 8/2002 | Logan | |
| 2002/0138376 A1 | 9/2002 | Hinkle | |
| 2002/0140960 A1 | 10/2002 | Ishikawa | |
| 2002/0143737 A1 | 10/2002 | Seki et al. | |
| 2002/0143871 A1 | 10/2002 | Meyer et al. | |
| 2002/0147733 A1 | 10/2002 | Gold et al. | |
| 2002/0161745 A1 | 10/2002 | Call | 707/1 |
| 2002/0178176 A1 | 11/2002 | Sekiguchi et al. | |
| 2002/0194324 A1 | 12/2002 | Guha | |
| 2003/0028889 A1 | 2/2003 | McCoskey et al. | |
| 2003/0069803 A1 | 4/2003 | Pollitt | |
| 2003/0069877 A1 | 4/2003 | Grefenstette et al. | |
| 2003/0105718 A1 | 6/2003 | Hurtado et al. | |
| 2003/0110130 A1 | 6/2003 | Pelletier | |
| 2003/0126247 A1 | 7/2003 | Strasser et al. | |
| 2003/0126362 A1* | 7/2003 | Camble et al. | 711/114 |
| 2003/0135464 A1 | 7/2003 | Mourad et al. | |
| 2003/0145209 A1 | 7/2003 | Eagle et al. | |
| 2003/0182304 A1 | 9/2003 | Summerlin et al. | |
| 2003/0233455 A1 | 12/2003 | Leber et al. | |
| 2004/0034632 A1 | 2/2004 | Carmel et al. | |
| 2004/0054630 A1 | 3/2004 | Ginter et al. | |
| 2004/0064447 A1 | 4/2004 | Simske et al. | |
| 2004/0064537 A1 | 4/2004 | Anderson et al. | |
| 2004/0068604 A1 | 4/2004 | Le et al. | |
| 2004/0083211 A1 | 4/2004 | Bradford | 707/3 |
| 2004/0143609 A1 | 7/2004 | Gardner et al. | |
| 2004/0158559 A1 | 8/2004 | Poltorak | 707/3 |
| 2004/0186827 A1 | 9/2004 | Anick et al. | |
| 2004/0193695 A1 | 9/2004 | Salo et al. | |
| 2004/0205448 A1 | 10/2004 | Grefenstette et al. | |
| 2005/0097081 A1 | 5/2005 | Sellen et al. | |
| 2005/0097092 A1 | 5/2005 | Annau et al. | |
| 2005/0144157 A1 | 6/2005 | Moody et al. | |
| 2005/0160481 A1 | 7/2005 | Todd et al. | |
| 2005/0223067 A1 | 10/2005 | Buchheit et al. | |
| 2005/0234843 A1 | 10/2005 | Beckius et al. | |
| 2005/0283473 A1 | 12/2005 | Rousso et al. | |
| 2006/0167842 A1 | 7/2006 | Watson | 707/3 |
| 2006/0173824 A1 | 8/2006 | Bensky et al. | |
| 2006/0230035 A1 | 10/2006 | Bailey et al. | |
| 2007/0011154 A1 | 1/2007 | Musgrove et al. | |
| 2007/0033177 A1 | 2/2007 | Friedman | |
| 2007/0033183 A1 | 2/2007 | Friedman | |
| 2007/0033410 A1 | 2/2007 | Eagle et al. | 713/176 |
| 2007/0038616 A1 | 2/2007 | Guha | |
| 2007/0050339 A1 | 3/2007 | Kasperski et al. | 707/3 |
| 2007/0050351 A1 | 3/2007 | Kasperski et al. | 707/4 |
| 2007/0061335 A1 | 3/2007 | Ramer et al. | |
| 2007/0088687 A1 | 4/2007 | Bromm et al. | |
| 2007/0192284 A1 | 8/2007 | Finley et al. | |
| 2007/0198470 A1 | 8/2007 | Freedman et al. | |
| 2007/0233692 A1 | 10/2007 | Lisa et al. | |
| 2007/0245108 A1 | 10/2007 | Yasaki et al. | |
| 2007/0253643 A1 | 11/2007 | Nagarajan | |
| 2007/0255686 A1 | 11/2007 | Kemp et al. | |
| 2007/0266009 A1 | 11/2007 | Williams | |
| 2007/0282811 A1 | 12/2007 | Musgrove | |
| 2007/0282826 A1 | 12/2007 | Hoeber et al. | |
| 2007/0288450 A1 | 12/2007 | Datta et al. | |
| 2008/0005651 A1 | 1/2008 | Grefenstette et al. | |
| 2008/0059187 A1 | 3/2008 | Roitblat et al. | |
| 2008/0059512 A1 | 3/2008 | Roitblat et al. | |
| 2008/0077570 A1 | 3/2008 | Tang et al. | |
| 2008/0097975 A1 | 4/2008 | Guay et al. | |
| 2008/0104032 A1 | 5/2008 | Sarkar | |
| 2008/0147644 A1 | 6/2008 | Aridor et al. | |
| 2008/0162498 A1 | 7/2008 | Omoigui | |
| 2008/0195601 A1 | 8/2008 | Ntoulas et al. | |
| 2009/0024612 A1 | 1/2009 | Tang et al. | |
| 2009/0182737 A1 | 7/2009 | Melman | |

OTHER PUBLICATIONS

*Beyond Backup Toward Storage Management* by M. Kaczmarski, T. Jiang and D.A. Pease. IBM Systems Journal, vol. 42, pp. 322-337, Nov. 2, 2003.

Amati, G. et al.; "Probabilistic Models of Information Retreival Based on Measuring the Divergence from Randomness"; ACM Transactions on Information Systems, vol. 20, No. 4. Oct. 2002.

Attar et al., "Local Feedback in Full-Text Retrieval Systems", Journal of the ACM (JACM), vol. 24, Issue 3 (Jul. 1977), pp. 397-417, ISSN:0004-5411.

Cai et al., "Automatic Query Expansion Based on Directed Divergence", Proceedings of the International Conference on Information Technology: Coding and Computing, p. 8, 2002, ISBN:0-7695-1506-1.

Cohen, E. et al.; "Processing Top k Queries from Samples"; ACM.

Conlon, S., "Automatic Web Searching and Categorizing Using Query Expansion and Focusing", (Mississippi University.), 6p, Jan. 2003.

Crestani, F. et al.; "Is This Document Relevant?. . . Probably": A Survey of Probabilistic Models in Information Retrieval; ACM Computing Surveys vol. 30, No. 4, Dec. 1998.

E. M. Voorhees, "Query expansion using lexical-semantic relations", Annual ACM Conference on Research and Development in Information Retrieval, Proceedings of the 17th annual international ACM SIGIR conference on Research and development in information retrieval, 1994, Dublin, Ireland, Aug. 1994, pp. 61-69, ISBN:0-387-1988-X.

Gauch et al., "A Corpus Analysis Approach for Automatic Query Expansion and Its Extension to Multiple Databases" *ACM Transactions on Information Systems*, vol. 17, No. 3, Jul. 1999, pp. 250-269.

Gehler, P. et al.; "The Rate Adapting Poisson Model for Information Retrieval and Object Recognition"; Proceedings of the 23rd International Conference on Machine Learning, 2006.

http://www.googleguide.com/tools.html <retrieved on Jul. 8, 2009>.
http://www.lexisnexis.com/toolbar/help/using.
htm#HighlightAndClick <retrieved on Jul. 8, 2009>.

Ilyas, I. et al.; "Adaptive Rank-Aware Query Optimization in Relational Databases"; ACM Transactions on Database Systems; vol. 31. No. 4, Dec. 2006.

Luk, R. et al.; "A Comparison of Chinese Document Indexing Strategies and Retrieval Models"; ACM Transactions on Asian Language Information Processing, vol. 1, No. 3, Sep. 2002.

Margulis, E.; "Modelling Documents with Multiple Poisson Distributions"; Information Processing & Management vol. 29, No. 2, 1993.

Margulis, E.; "N-Poisson Document Modelling"; SIGIR '92.

Mei, Q. et al.; "A Study of Poisson Query Generation Model for Information Retrieval"; SIGIR '07 Proceedings, Session 12: Formal Models.

Mitra et al., "Improving Automatic Query Expansion", Annual ACM Conference on Research and Development in Information Retrieval, Proceedings of the 21st annual international ACM SIGIR conference on Research and development in information retrieval, Melbourne, Australia, pp. 206-214, Year of Publication: 1998, ISBN:1-58113-015-5.

Ozmutlu, H. et al.; "Analysis of large data logs: an application of Poisson sampling on excite web queries"; Information Processing and Management, vol. 38, 2002.

Robertson, S. et al.; "Some Simple Effective Approximations to the 2-Poisson Model for Probabilistic Weighted Retreival"; Centre for Interactive Systems Research, London.

Roelleke, T.; "A Frequency-based and a Poisson-based Definition of the Probability of Being Informative"; SIGIR '03.

Tao, Y. et al.; "Indexing Multi-Dimensional Uncertain Data with Arbitrary Probability Density Functions"; Proceedings of the 31st VLDB Conference, Norway 2005.

Volkmer et al., "Exploring Automatic Query Refinement for Text-Based Video Retrieval", *IEEE International Conference on Multimedia and Expo*, Jul. 9-12, 2006, pp. 765-768, Toronto, Ont., ISBN: 1-4244-0366-7.

Xu et al., "Query expansion using local and global document analysis," in Proc. of ACM-SIGIR 1996, Zurich, Switzerland, Aug. 18-22, 1996, pp. 4-11.

Yan, T. et al.; "The SIFT Information Dissemination System"; ACM Transactions on Database Systems, vol. 24, No. 4, Dec. 1999.

Zakariah, R. et al.; "Detecting Junk Mails by Implementing Statistical Theory"; IEEE Proceedings of the 20th International Conference on Advanced Information Networking and Applications, 2006.

Roitblat, Herbert L. (2004), "Electronic Data Are Increasingly Important to Successful Litigation", Trends in Electronic Data.

Roitblat, Herbert L. (2005), "Document Retrieval", DolphinSearch, Inc.

"The Sedona Principles: Best Practices Recommendations & Principles for Addressing Electronic Document Production," *The Sedona Conference Working Group Series*, Jul. 2005 Version.

Meng, W., et al., "Building Efficient and Effective Metasearch Engines," *ACM Computing Surveys, ACM*, New York, NY, US, US, vol. 34, No. 1, Mar. 1, 2002, pp. 48-89.

PCT Search Report and Written Opinion dated Jun. 18, 2008, PCT/US07/13483.

PCT Search Report and Written Opinion dated May 8, 2009, PCT/US2009/032990.

* cited by examiner

SYSTEM AND METHOD FOR DETECTING INCONGRUOUS OR INCORRECT MEDIA IN A DATA RECOVERY PROCESS

CROSS-REFERENCE TO RELATED APPLICATIONS

This application claims priority from U.S. Provisional Patent Application Ser. No. 60/634,352, filed Dec. 8, 2004, which is hereby incorporated herein by reference in its entirety for all purposes.

FIELD OF THE INVENTION

This invention relates generally to data backup and recovery processes and, more particularly, to automated data processing systems and methods for detecting incongruous, inconsistent, or incorrect media in a data recovery process.

BACKGROUND OF THE RELATED ART

Data recovery services have become an important part of today's digital world. Many entities, especially those that create and store significant amounts of electronic data, rely on data recovery services to recover data from data backup storage media such as tapes, discs, disk drives, or other removable storage devices.

Recovering a large volume of electronic data typically involves processing many, in some cases, thousands of items of backup storage media. In practice, on the production floor, multiple large volumes of data recovery jobs may be processed coincidentally. Factors such as close temporal and spatial relationships among thousands of data media may cause incongruous, inconsistent, incorrect, or improper media items to be loaded into a job that they do not belong.

Currently, most data recovery services employ manual inspections to detect out of place media in a data recovery job. Human inspector(s) must manually check every physical media label and cross reference it against a master list for a particular data recovery job. This process is time-consuming, tedious, and potentially inaccurate. Moreover, even after manually checking every label, there is no guarantee that all data backup media loaded into a data recovery job are correct because a correct label could have been mistakenly applied on or otherwise attached to a wrong medium (e.g., a tape that is not a member of the backup job being recovered). In the event that a mistake (e.g., an incorrect medium) is found, it can cause an entire job to be re-executed, wasting time and money.

A need exists for a computer-implemented, automated data recovery system and method that can detect mistakes at various stages of a data recovery process, avoiding entirely or substantially reducing the probability of loading incongruous or incorrect media into a job that they do not belong. Embodiments of the present invention address this need and more.

SUMMARY OF THE INVENTION

Embodiments of the present invention provide an automated system and method for detecting and preventing wrong media from becoming part of a job that they do not belong. A job is a physical and/or logical set of data that belong to a customer order for data recovery, which can be classified into native data recovery and non-native data recovery. As one skilled in the art will appreciate, while embodiments of the invention disclosed herein can be utilized to process native data recovery jobs, they can be particularly useful for non-native data recovery jobs. In addition, embodiments of the invention disclosed herein can be particularly useful in processing large volumes of data recovery jobs.

One embodiment of the invention can detect when a wrong data backup storage medium (e.g., a tape or cartridge) is incorrectly placed into a data recovery job (e.g., a set of tapes) on the production floor. Detecting such an error early in a data recovery process can save time, reduce costs, and help prevent wrong data from being returned to a customer.

One embodiment of the invention can detect physical characteristics, for example, tape type, density, identifying tags or labels, etc., of a data backup storage medium and, based on the detected physical characteristics, compare the data backup storage medium with a predefined set of acceptable media for a particular job or job lot. This method can detect the most blatant media errors and can be combined with other methods to detect and eliminate most errors.

By way of example, a first method restricts media in a job based upon source data type. For example, if a job to be processed contains Tivoli® tapes only (i.e., tapes recorded using a Tivoli® data-backup system), then only Tivoli loading tools are allowed to run. An attempt to run other types of loading tools, e.g., NetBackup®, will result an error message. One factor to be considered is that two different jobs may involve the same source data type.

A second method employs a predefined set of media identifications to determine whether a data backup storage medium belongs to a particular job. Media identifications can be arbitrary and, in one embodiment, can be configured and set by customers. For example, a job may contain a set of unique media identifications, each of which can include, for example, a serial number, a physical label, or a combination thereof. On most electronic data backup systems, media are usually identifiable, by physical labels bearing barcodes positioned on the outside of the media. The media identifications contained in the barcodes can also be electronically written to some type of media header (e.g., on the first block or two of the data). Other types of media identifications can be adapted to implement this method. Assuming that a list of media identifications can be generated (e.g., from barcodes) to identify all of the media belonging to the same job, this method can systematically and programmatically determine whether a particular data backup storage medium is incongruous (i.e., out of place, inappropriate, inconsistent, or incorrect). One factor to consider is that, although current data backup systems commonly require media barcodes to be entered in sequence, human errors may still be possible (e.g., a correct barcode label is placed on a wrong backup medium, and vice versa).

One embodiment of the invention comprises a software tool or a set of tools (referred herein as the "Fingerprinter") that can develop/generate a fingerprint, signature, or profile for a job by creating a signature for each storage medium in the job and comparing these signatures. In this embodiment, the Fingerprinter operates to analyze directory structure patterns and naming conventions and apply a pattern representation formula to them that yields a signature for that job. As each file or item is read, a new signature is correspondingly calculated and compared to the overall signature of the job. In one embodiment, a set of media signatures obtained or generated thus far for the job represents the overall signature of the job. This overall job signature can be updated as additional media are analyzed and/or recovered while processing the job. Media signatures for each storage medium must match defined criteria to be considered part of the same job. The Fingerprinter can be customized so that if the signature of the new storage medium is different from the rest by some preset margin; a human inspector or operator may be notified or warned and asked to double check whether the storage medium is correct (i.e., it is part of that job). If it is correct, the overall signature for the job can be revised to integrate the new signature. If it is incorrect, the Fingerprinter or another software tool can operate to remove all data in the recovery job that had been incorrectly loaded from the wrong storage medium. In this manner, the accuracy of this method of ensuring correct media increases with the number of media processed. After several media have been processed, the anomaly (i.e., wrong media) can analyzed more accurately.

This invention represents a significant improvement in detecting incongruous or incorrect media in data recovery processes. Embodiments disclosed herein can deliver fast and timely results, can detect the presence of a wrong medium quickly and early in a data recovery process and can automatically stop processing an incongruous or incorrect medium. Any medium identified as incorrect or, potentially incorrect can either be removed or confirmed to be valid. Other objects and advantages of the present invention will become apparent to one skilled in the art upon reading and understanding the detailed description of the preferred embodiments described herein with reference to the following drawings.

DETAILED DESCRIPTION

The invention and various features and advantageous details thereof are explained more fully with reference to the exemplary, and therefore non-limiting, embodiments that are illustrated in the accompanying drawings and detailed in the following description. Descriptions of known programming techniques, computer software, hardware, operating platforms and protocols may be omitted so as not to unnecessarily obscure the invention in detail. It should be understood, however, that the detailed description and the specific examples, while indicating preferred embodiments of the invention, are given by way of illustration only and not by way of limitation. Various substitutions, modifications, additions and/or rearrangements within the spirit and/or scope of the underlying inventive concept will become apparent to those skilled in the art from this disclosure.

Embodiments of the invention provide an automated system and method for detecting and identifying that a storage medium (e.g., removable tape or disk) in a data recovery job may be incorrect and/or may not belong to a physical and/or logical set (e.g., a media pool of a particular job). According to one embodiment of the invention, the automation disclosed herein can be described as semi-automatic, for it can employ limited human inspection for verification purposes.

Figure 1:
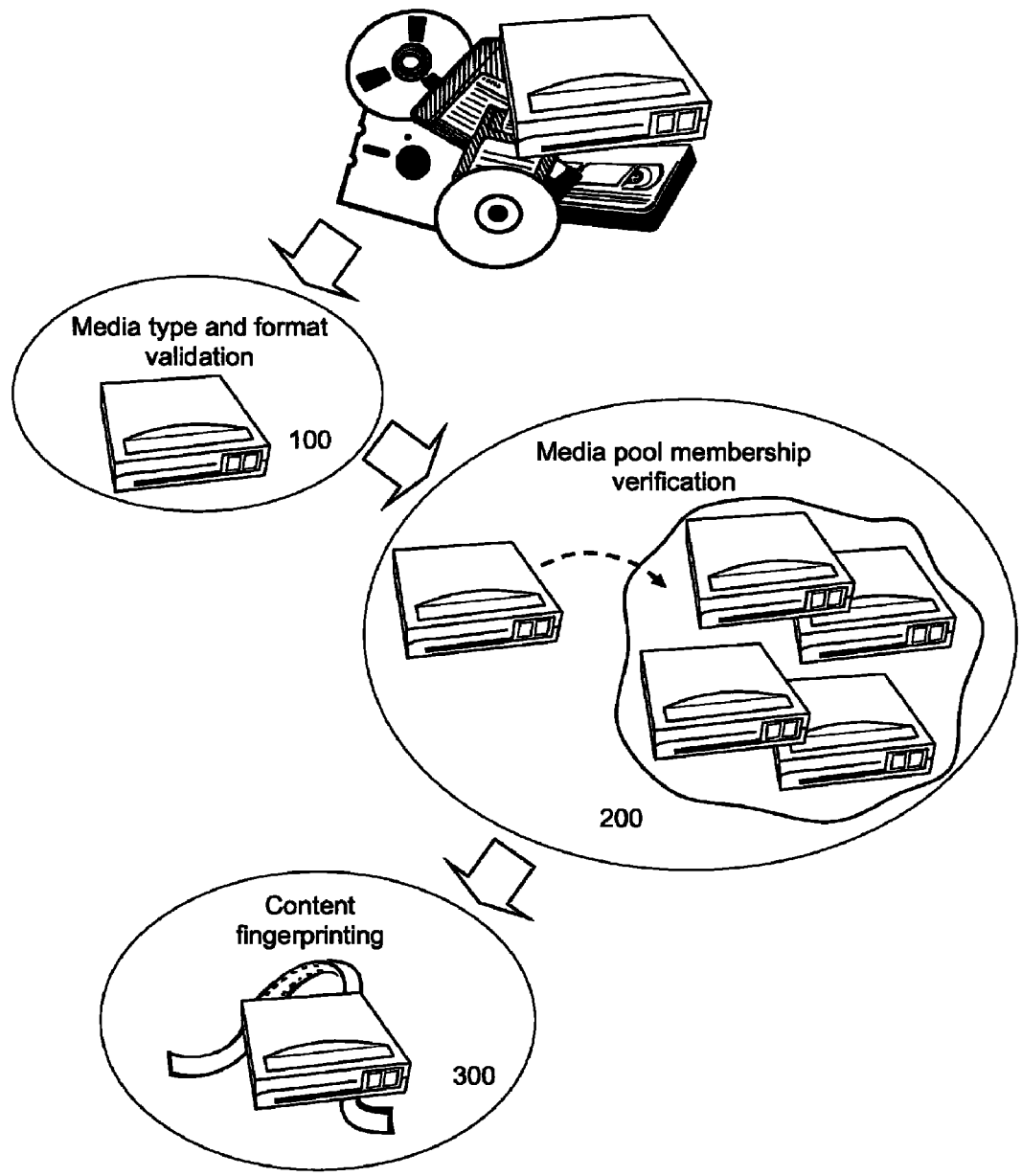
FIG. 1 illustrates three methods for processing data backup storage media in various stages of a data recovery process, according to one embodiment of the invention.

FIG. 1 illustrates three distinct methods (or processes) for processing data backup storage media in various stages of a data recovery process. One embodiment employs all three processes to minimize the likelihood of adding improper data to a data recovery job where it does not belong. Other embodiments may employ one or more of these distinct processes: media type and format validation 100, media pool membership verification 200, and content fingerprinting 300. That is, these processes may be employed independently and in combination. The process of media type and format validation 100 is described in more detail below with reference to FIG. 2. The process of media pool membership verification 200 is described in more detail below with reference to FIG. 3. The process of content fingerprinting 300 is described in more detail below with reference to FIGS. 4 and 5.

Media type and format validation. As illustrated in FIG. 1, although storage media are currently available in many types and formats, for a given set of media that need to be processed in the normal flow of business, it is likely that all members of the set would have the same physical media type and corresponding formatting algorithm. If the format is changed at some point, the set of media might be grouped into smaller pools of common media type and format. Thus, for a given set of media, the processing environment can be configured to restrict or limit a certain media type and format and to allow only tools that can correctly process the predetermined media type and format.

Figure 2:
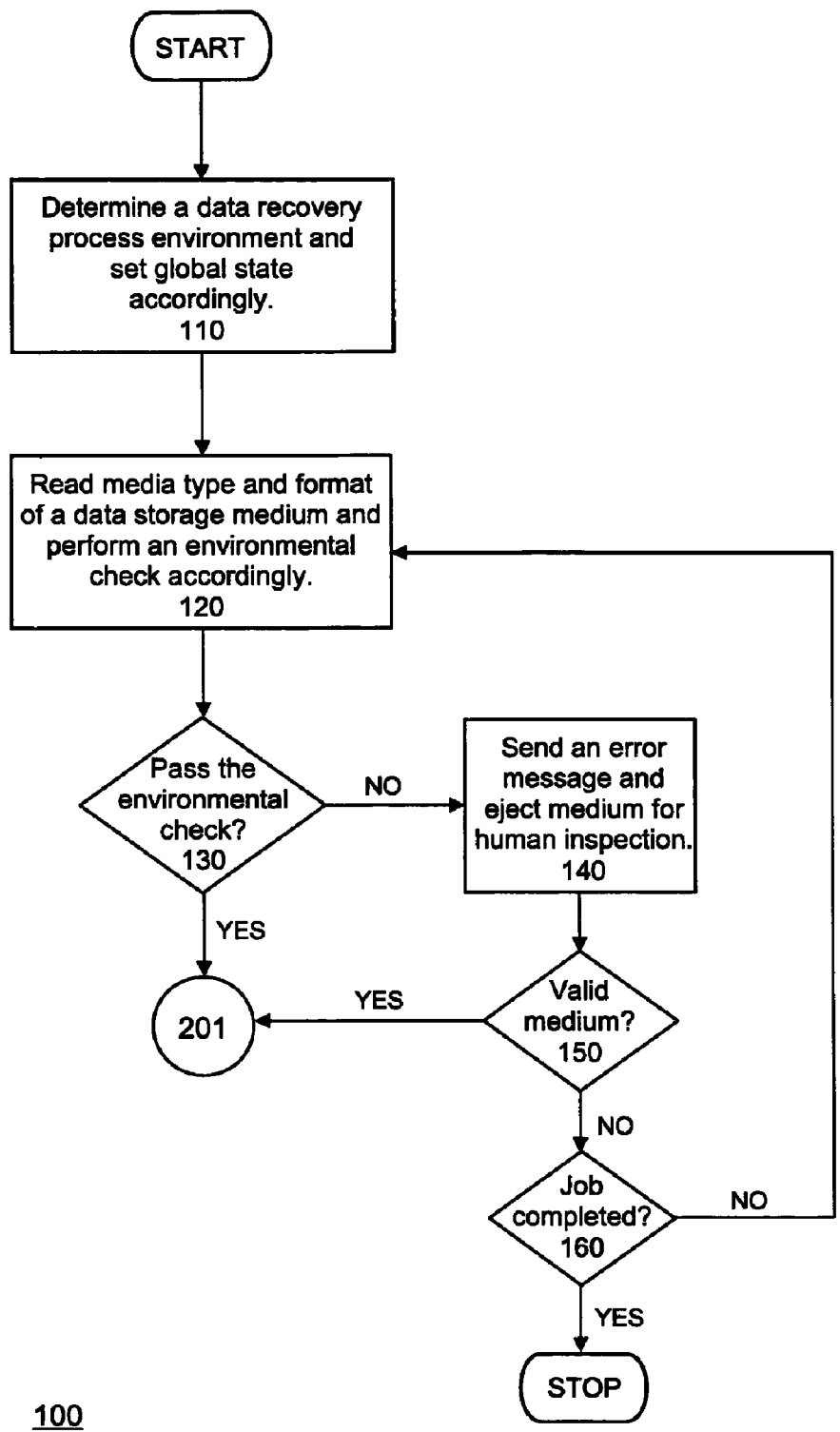
FIG. 2 is a flow diagram representative of a first method that can detect media that do not comply with a predefined processing environment, according to one embodiment of the invention.

FIG. 2 is a flow diagram representative of one embodiment of a media type and format validation process 100 that may detect media and/or media processing tools that do not comply with a predefined processing environment. As one skilled in the art can appreciate, a processing environment may encompass a runtime operation system (e.g., Windows® XP operating system, Red Hat Linux® operating system, etc.), back-up programs (e.g., Legato® backup software, etc.), media type (e.g., tapes, cartridges, discs, etc.). The runtime operating system can be configured to set global variables or parameters that can be read by any program run in the processing environment. Accordingly, the first step (step 110) is to set a processing environment that defines the media type and media format for processing the media in a particular job. In other words, media not of the defined media type and media data format may not belong to the job and should be excluded or at least inspected to verify that those media do or do not belong to this job. These process environment settings remain unchanged until the global state is set to a new value. As an example, the media type is set for DLT® tapes or cartridges, available from Quantum Corporation of Boulder, Colo., and the media format is set to Legato® backup software, available from EMC Legato of Santa Clara, Calif. One skilled in the art will recognize that the processing environment could be configured to process many other media types and formats.

In step 120, a media processing application or tool (e.g., software programming) is run to read a data backup storage medium (e.g., a DLT® tape cartridge) and determines the media type and media format of the storage medium. In step 130, the media processing tool performs an environmental check to validate or invalidate the storage medium. If the media type and media format environmental setting matches the function of the media processing tool, it advances to the next stage via step 201. Otherwise, the media processing tool sends an error message indicating that the storage medium is not permitted to run in the current environment (step 140). In the example above, the media processing tool would examine the storage medium to determine if the storage medium was a DLT® tape containing data stored in the Legato® backup software data format. If the storage medium was a DLT® tape containing Legato® formatted data, the media processing tool would indicate that the storage medium "passed" at step 130. If the tape was of a different type or of a different media format, the media processing tool would indicate that the storage medium did not pass and could move to step 140. In one embodiment, a human inspection may be employed to verify the media type of the rejected medium (step 150). This can safeguard machine errors and media irregularities and allow correct media types that might otherwise have been deemed invalid by the media processing tool to be inserted into a job. In one embodiment, no human inspection is utilized, in which case, steps 140 and 150 are skipped. In one embodiment, in case where a first media processing tool exits on the first try or the first few tries, a second (or more if necessary) media processing tool may be run to read the data backup storage medium. In one embodiment, once a media processing tool passes the environmental check, it may be employed to validate/invalidate media type and format for all media in a data recovery job. In one embodiment, process 100 may include step 160 to determine whether the job has been completed when an incorrect storage medium is detected. If not, the media processing tool may operate to read the next data backup storage medium. If so, the process validation flow 100 is completed for the particular job or subset of a particular job.

Media pool membership. As discussed above, once the media processing tool passes the environmental check, it can start on the next stage, media pool membership verification process 200, via step 201. According to one embodiment of the invention, media pool membership verification 200 is the second major stage in the media validation process. Generally, when media are received by a processing plant, the first step is media registration. This means that, for a given set of media, each physical medium of the set of media is inspected for a unique identifier (ID), such as a barcode, radio frequency ID (RFID) or the like, that can be recorded for later verification. These identifiers can generally be found on the physical media themselves (e.g., a barcode label). During media registration, each storage medium is visually and/or electronically inspected and its physical identifier is manually or electronically entered into an electronic list or database. Hence, in one embodiment, a media pool refers to a list of members of a particular set (e.g., a customer's job or a subgroup thereof). This list can be used to identify/verify media pool membership. In a simple example, a job for a customer could consist of 100 Legato® formatted DLT® tapes with identifications 1 through 100.

Figure 3:
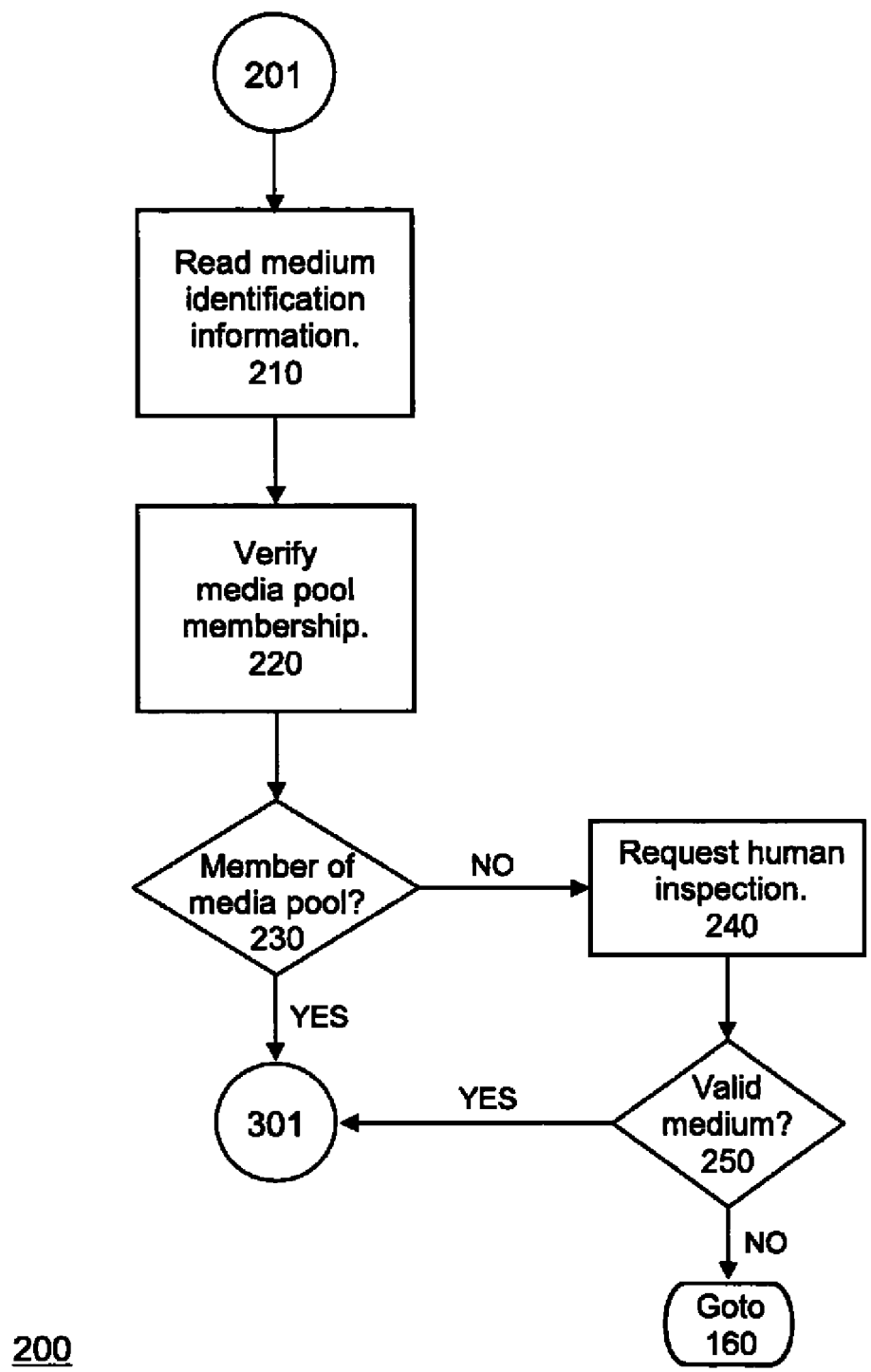
FIG. 3 is a flow diagram representative of a second method that can detect media that are not members of a media pool, according to one embodiment of the invention.

Referring to FIG. 3, in step 210, the media processing tool can have the ability to obtain at least one of two types of media identification (ID) information from the currently loaded (inserted) storage medium. One type of media identification is associated with a physical label bearing information that can be read by an electronic device, e.g., barcode, radio frequency ID (RFID), smart tag, etc. The physical label can usually be found on the corresponding media case or container, if available, of the storage medium. The physical label may carry electronic information that includes the serial number of the storage medium and/or a designated job number, etc. As an example, using a commercially available scanning device (e.g., a barcode scanner), such information can be readily imported into an electronic spreadsheet program, database, or the like. The electronic information from the physical label is held, for instance, in a data storage device such as a cache, a database, or a random access memory.

Another type of media identification is associated with the initial data on the media; for example, the header of a storage medium. The header information can often be analyzed to ascertain a media identifier. Once at least one of these two types of media identifications are obtained at step 210, multiple distinct checks can be performed. In step 220, as an example, barcode scanned from a physical label of the storage medium (i.e., first type of media identification) can be compared with the media identifier derived from the header (i.e., second type of media identification). This confirms the physical label of the storage medium matches the media identification of storage medium. If they match, then the media identifier is compared with the media pool membership list at step 230 to verify whether the current storage medium is a member of the media pool that is being processed. In alternative embodiments, only one or the other media identification type from a particular storage medium is verified against the media pool membership list at step 220.

If the media identifier(s) matches an entry on the media pool membership list, the probability is high that the storage medium is valid (i.e., that the current storage medium belongs to the given set of media). Accordingly, it is allowed to proceed to the next stage at step 301. If the media identifier does not match an entry on the media pool membership list, processing is suspended and optionally a request can be made for a human inspection at step 240. In this embodiment, a human operator or inspector may be asked to validate the storage medium. In step 250, if the inspector validates the storage medium as being correct (i.e., valid), the information is logged for future reference (e.g., updating the media pool membership list with the media identifier) and the media processing proceeds to the next stage via step 301. If the inspector confirms that the storage medium is incorrect or invalid, the media processing tool ejects the current storage medium and proceeds to step 160 to process the next storage medium until all of the media in the given set of media (i.e., the media pool or the job), are processed. In one embodiment, human inspection steps 240 and 250 may be skipped so that, if there is no match, the media processing tool simply ejects the invalid storage medium without human inspection and proceeds to step 160.

Referring back to step 220, in the case that the physical medium identifier (e.g., a barcode from the media container) and the digital media identifier (e.g., data identification in the header) do not match, both can be independently checked against the media pool membership list in step 230, according to one embodiment of the invention. If both appear to be on the media pool membership list or either one matches an entry on the media pool membership list, then the storage medium can potentially be valid. To be sure, in one embodiment, a human operator or inspector may be asked to confirm the current storage medium's membership in the media pool. The inspector may accept (approve) or reject it. If the storage medium is accepted, the media pool membership list can be updated accordingly and the media processing tool proceeds to the next stage via step 301. If the storage medium is rejected, or neither the barcode from the media container nor the media identifier matches an entry on the media pool membership list, the storage medium is ejected and the media processing tool proceeds to step 160.

Figure 4:
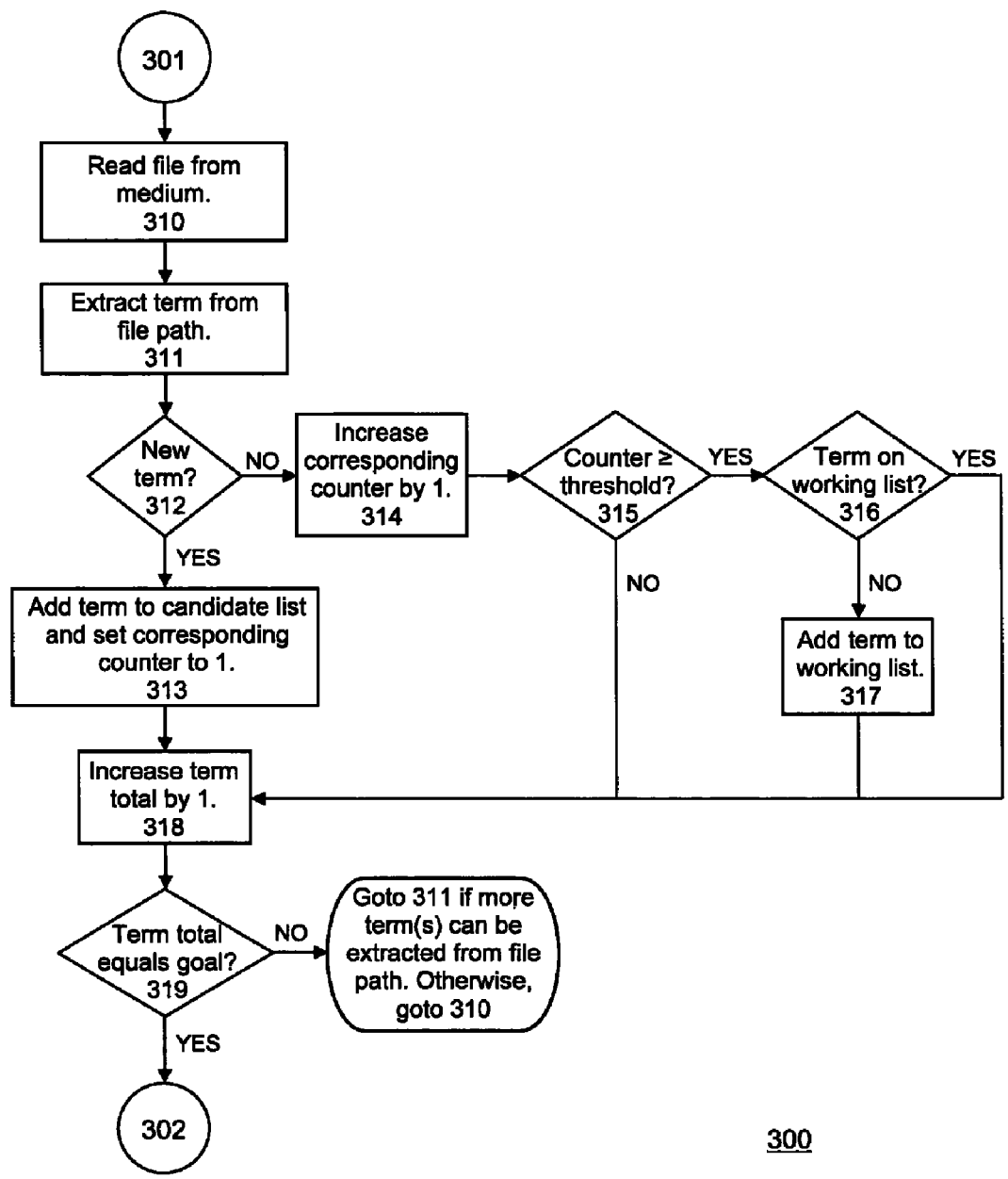
FIGS. 4-5 are flow diagrams representative of a third method that can detect media that do not fit the profile of a job being processed, according to one embodiment of the invention.
Figure 5:
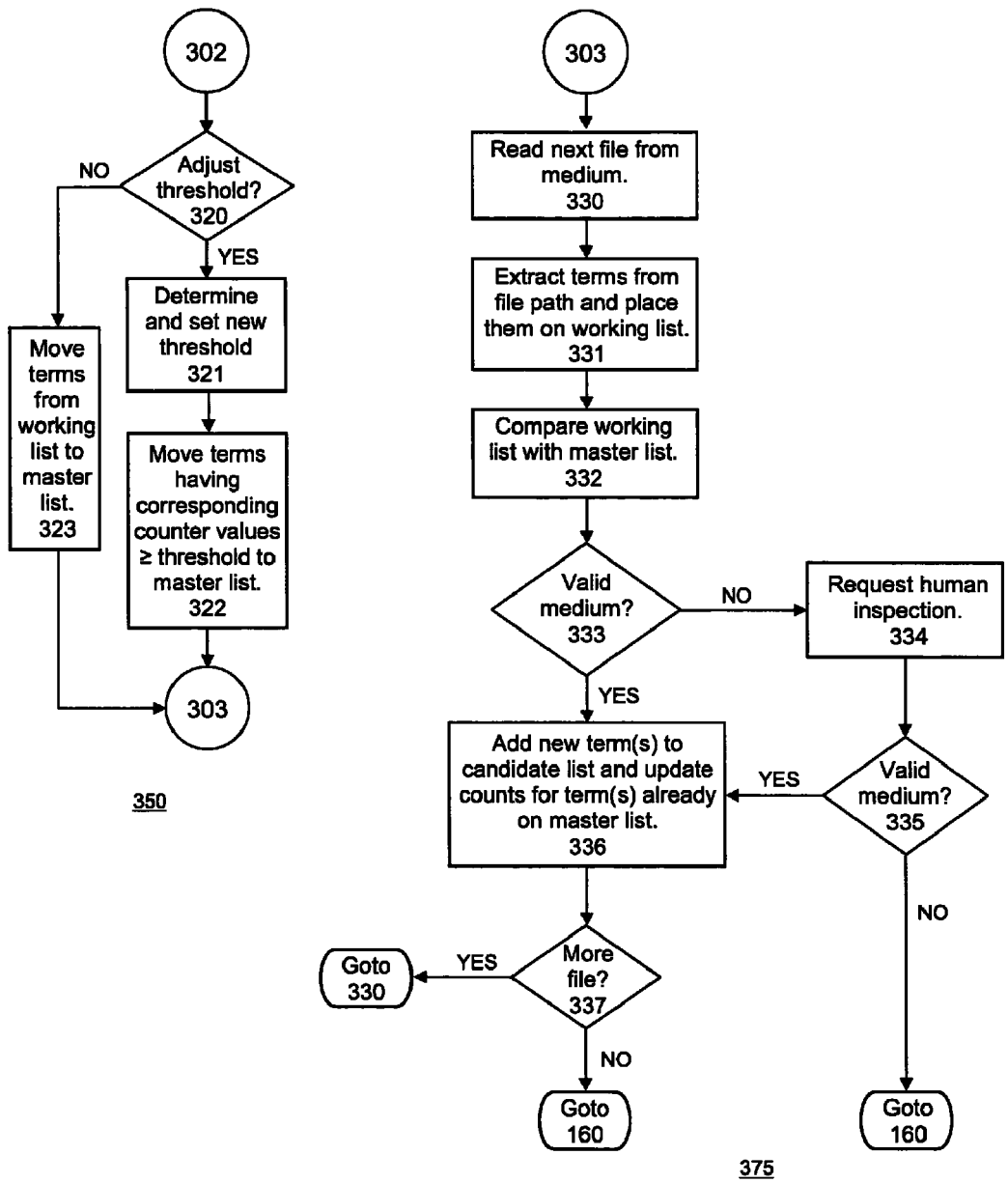

Content fingerprinting. Once a storage medium's media pool membership is confirmed, whether it is through matching an entry on a media pool membership list or by the approval of a human inspector, it is ready for the next stage, content fingerprinting 300, one embodiment of which is illustrated in FIG. 4 and FIG. 5. According to one embodiment of the invention, this is the final stage in the process of media identification. A first goal is to find a fingerprint, a signature, a profile or some other unique content indication that identifies a given media pool. In one embodiment of the invention, this goal can be accomplished by building a relatively short master list of common words/terms that can be found or determined to have a high probability of occurrence somewhere in members of the given media pool. In one embodiment, the master list may be constructed by scanning file paths and extracting components (terms) of each file path, such as file names, directories, servers, sources, resources, keywords, and so on from the file paths scanned.

In one embodiment, if a storage medium contains a certain percentage of terms that appear on the master list, that particular storage medium is considered valid. If none or very few terms can be found to match terms on the master list, a human user is asked to verify the storage medium's validity. If the human user does confirm that the particular storage medium is valid, the master list can be updated to include new term(s) extracted from the file paths of the human inspected storage medium. If the inspected storage medium is deemed invalid for this particular media pool, then any data thus far processed from the storage medium is marked as invalid and purged from the processing system. In one embodiment, human inspection for the first storage medium to be processed for a media pool is always requested to ensure that the initial master list is not an invalid list.

FIGS. 4 and 5 are flow diagrams illustrating the content fingerprinting process according to one embodiment of the invention. In this example, a first set of criteria are utilized to build a master list of common terms and a second set of criteria are utilized to determine whether there is a match or not. These criteria can be set by policy or convention, e.g., a server name can be a criterion. For example, to be a member of a media pool, a storage medium would need to have (e.g., in its file path(s)), a server name that also appears on the master list of common terms.

Referring to FIG. 4, steps 310-319 can be characterized as a profile building phase for programmatically building a foundation of a profile, a signature, or a fingerprint for a master list. A master list is a list of common terms that identify a given media pool (i.e., a set, a group or groups of sets, a job, or a job lot). More specifically, in one embodiment, each file or item is read from a storage medium at step 310 and its file path is scanned and analyzed to identifiable extractable terms (e.g., path components, names, words, dates, numbers, labels, etc.) at step 311. TABLE 1 below shows exemplary path names from two storage media (Tape #1 and Tape #2).

TABLE 1

| Tape # 1 |
| --- |
| PUB_Creative _PIN-Bob_April images_4\4 images_012345 Annuity_FIXED.DOC |
| PUB_Creative _PIN-Bob_April images_4\4 images_012345 Annuity_FIXED.DOC |
| PUB_Creative _PIN-Bob_April images_4\6 images_star.pdf |
| PUB_Creative _PIN-Bob_April images_4\6 images_blur.jpg |
| PUB_Creative _PIN-Bob_April images_4\6 images_blur.jpg |
| PUB_Creative _PIN-Steve_first.gif |
| PUB_Creative _PIN-Steve_e_PV.psd |
| PUB_Creative _PIN-Steve_e_PV.psd |
| PUB\CREATIV0\PIN-STEV\SNOWCAP\BANK_CUST.BMP |
| PUB\CREATIV0\PIN-STEV\SNOWCAP\BANK_CUST.BMP |
| PUB_Creative _PIN-Steve_Employee_Invite.gif |
| PUB_Creative _PIN-Steve_Employee_Inv2.gif |
| PUB_Creative _PIN-Steve_e_Web Templates_Final Style Guide Part II.doc |
| PUB_Creative _PIN-Steve_e_Web Templates_Final Style Guide Part I.doc |
| PUB_Creative _PIN-Steve_e_Web Templates_e_Pre Login.psd |
| PUB_Creative _PIN-Steve_e_Web Templates_e_Login Page.psd |
| PUB_Creative _PIN-Steve_e_Web Templates_e_Internal.psd |
| PUB_Creative _PIN-Steve_e_Layouts_e_Login Page.psd |
| PUB_Creative _PIN-Steve_e_Layouts_e_Pre Login.psd |
| PUB_Creative _PIN-Steve_e_Layouts_Final Style Guide Part I.doc |
| PUB_Creative _PIN-Steve_99 Forms for PIN_ONE.doc |
| PUB_Creative _PIN-Steve_99 Forms for PIN_TWO.doc |
| PUB_Creative _PIN-Steve_99 Forms for PIN_THREE.doc |
| PUB_Creative _PIN-Steve_99 Forms for PIN_FOUR.doc |
| PUB_Creative _Presentations-Power Point_Technology_BS99999.tiff |
| PUB_Creative _Presentations-Power Point_Technology_BS99999\type working |
| PUB_Creative _Presentations-Power Point_Technology_bars red |
| PUB_Creative _Presentations-Power Point_Technology_bars blue |
| PUB\CREATIV0\MARYTR\IMAGES\PRODUCTS\KYBD.JPG |
| PUB\CREATIV0\MARYTR\IMAGES\PRODUCTS\UPS0.JPG |
| PUB\CREATIV0\MARYTR\IMAGES\PRODUCTS\UPS1.GIF |
| PUB\CREATIV0\MARYTR\IMAGES\PRODUCTS\UPS2.GIF |
| PUB_Creative _Mary Transfer (SAVE)_PIN_PSPBRWSE.JBF |
| PUB_Creative _Mary Transfer (SAVE)_VIP stuff_Desktop.pdf |
| PUB_Creative _Mary Transfer (SAVE)_VIP stuff_folder.pdf |
| PUB_Creative _Mary Transfer (SAVE)_postcard images_Page 1.pdf |
| PUB\CREATIV0\MARYTR\POSTCARD\ICARE1.JPG |
| PUB_Creative _Mary Transfer (SAVE)_postcard images_Page 3.jpg |
| PUB\CREATIV0\MARYTR\POSTCARD\AAA99999 |
| PUB\CREATIV0\MARYTR\POSTCARD\PAGE3.JPG |
| PUB\CREATIV0\MARYTR\POSTCARD\RETIRE.PDF |
| PUB\CREATIV0\MARYTR\POSTCARD\COLLEGE.PDF |
| PUB_Creative _Mary Transfer (SAVE)_99 Ad Stats_Money.pdf |
| PUB_Creative _Mary Transfer (SAVE)_99 Ad Stats_Merger.pdf |
| PUB_Creative _Mary Transfer (SAVE)_99 Ad Stats_Regulations.pdf |
| PUB_Creative _Mary Transfer (SAVE)_99 Ad Stats_Estate.pdf |

TABLE 1-continued

```
PUB_Creative _Mary Transfer (SAVE)_99 Ad Stats_Retirement.pdf
PUB\CREATIV0\MARYTR\BROCHURE\XROBR.JPG
PUB\CREATIV0\MARYTR\BROCHURE\XSIPC.JPG
PUB\CREATIV0\MARYTR\BROCHURE\XTDBR.JPG
PUB\CREATIV0\MARYTR\BROCHURE\X9999.JPG
PUB\CREATIV0\MARYTR\BROCHURE\XGOL9.JPG
PUB\CREATIV0\MARYTR\BROCHURE\XTIBR.JPG
PUB\CREATIV0\MARYTR\BROCHURE\XAABR.JPG
PUB\CREATIV0\MARYTR\BROCHURE\XCDBR.JPG
PUB_Creative _Transfer_PowerPoint Graphics_logo guidelines_PV9.ppt
PUB_Creative _Transfer_PowerPoint Graphics_logo guidelines_CLAS.ppt
PUB_Creative _Transfer_PowerPoint Graphics_logo guidelines_BW.ppt
PUB_Creative _Transfer_PowerPoint Graphics_logo guidelines_SN00602_.MID
PUB_Creative _Logos - Icons_GuidePro Logos_GuidePro.eps
PUB_Creative _Logos - Icons_GuidePro Logos_GuidePro.eps
PUB_Creative _Logos - Icons_BWest Logos_BWest BMP_BWest.bmp
PUB_Creative _Logos - Icons_BWest Logos_BWest EPS_BWest Logo.eps
PUB_Creative _Logos - Icons_BWest Logos_BWest EPS_BWest Logo.eps
PUB_Creative _Logos - Icons_BWest Logos_BWest EPS_BWest Logo.eps
PUB_Creative _Logos - Icons_BEST Logos_BEST JPG_BEST.jpg
PUB_Creative _Logos - Icons_Community Logos_Community EPS_Investment PUB_Creative
_Logos - Icons_Community Logos_Community EPS_Services.eps
PUB_Creative _Logos - Icons_Community Logos_Community JPG_CFBbw.jpg
PUB_Creative _Logos - Icons_FIS Logos_FIS Logo JPG_FIS.JPG
PUB_Creative _Logos - Icons_FNB Logos_FNB EPS_FNB.eps
PUB_Creative _Logos - Icons_FNB Logos_FNB PDF_FNB.pdf
PUB_Creative _Logos - Icons_ING Sub Logos_ING-lion white.eps
PUB_Creative _Logos - Icons_ING Sub Logos_ING-American.eps
PUB_Creative _Logos - Icons_ING Sub Logos_ING-American.jpg
PUB_Creative _Logos - Icons_ING Sub Logos_ING-Select.eps
PUB_Creative _Logos - Icons_ING Sub Logos_ING-Select.jpg
PUB_Creative _Logos - Icons_ING Sub Logos_ING-Pilgrim white.eps
PUB_Creative _Logos - Icons_Logos_Logo JPG_PV_LogoBW.jpg
PUB_Creative _Logos - Icons_Logos_Logo JPG_PV_LogoClr.jpg
PUB_Creative _Logos - Icons_Logos_Logo JPG_StackedLogo_BW.jpg
PUB_Creative _Logos - Icons_Logos_Logo JPG_StackedLogo_Clr.jpg
PUB_Creative _Logos - Icons_Logos_Logos EPS_FinalLogo Specs.eps
PUB_Creative _Logos - Icons_Logos_Logos EPS_PV_logo White.eps
PUB_Creative _Logos - Icons_Logos_Logos EPS_PV_logoBW.eps
PUB_Creative _Logos - Icons_Logos_Logos EPS_PV_LogoClr.eps
PUB_Creative _Logos - Icons_Logos_Logos EPS_Stacked Logo BW.eps
PUB_Creative _Logos - Icons_Logos_Logos EPS_Stacked Logo Color.eps
PUB_Creative _Logos - Icons_Logos_Logos EPS_Stacked Logo White.eps
PUB_Creative _Logos - Icons_Logos_Logos TIFF_PV_logoBW.tif
PUB_Creative _Logos - Icons_Logos_Logos TIFF_PV_LogoClr.tif
PUB_Creative _Logos - Icons_Logos_Logos TIFF_Stacked Logo BW.tif
PUB_Goody_boardwalk.eps
PUB_Goody_castle.eps
PUB_Goody_cover
PUB_Goody_Goody.tiff
PUB_Goody_Goody.logo.eps
PUB_Goody_epcot.eps
PUB_Goody_flyer
PUB_Goody_kingdom.eps
PUB_Goody_logo.tiff
PUB_Goody_flyer-schuster family\paul
PUB_Goody_flyer-brown family\troy
PUB_Goody_flyer-labord family\steve
PUB_Goody_flyer-engle family\john
PUB_Goody_flyer-moore family\topher
PUB_Goody_flyer-ritchie family\emily
PUB_Goody_flyer-COOL family\schuster
PUB_Photos_B.Liz.bmp
PUB_Photos_B.Taylor.bmp
PUB_Photos_B.Taylor.tiff
PUB_Photos_C.Hackman.eps
PUB_Photos_C.Anna
PUB_Photos_C.Hank b\w
PUB_Photos_C.Bruce
PUB_Photos_Stanford.bmp
PUB_Photos_D.Ashton
PUB_Photos_D.Ashton b\w
public\mgmt\ConsoleXYZ\1.9\Help\zh_TW\net_rconsole\weblinks.html
public\mgmt\ConsoleXYZ\1.9\Help\zh_TW\net_rconsole\xrefbtn.gif
public\mgmt\ConsoleXYZ\1.9\Help\zh_TW\net_rconsole\about.html
public\mgmt\ConsoleXYZ\1.9\Help\zh_TW\net_rconsole\access.html
public\mgmt\ConsoleXYZ\1.9\Help\zh_TW\net_rconsole\advanced.html
public\mgmt\ConsoleXYZ\1.9\Help\zh_TW\net_rconsole\cantconnect.html
public\mgmt\ConsoleXYZ\1.9\Help\zh_TW\net_rconsole\connect.html
public\mgmt\ConsoleXYZ\1.9\Help\zh_TW\net_rconsole\connectedto.html
```

TABLE 1-continued

```
public\mgmt\ConsoleXYZ\1.9\Help\zh_TW\net_rconsole\connectionfailed.html
public\mgmt\ConsoleXYZ\1.9\Help\zh_TW\net_rconsole\console.html
public\mgmt\ConsoleXYZ\1.9\Help\zh_TW\net_rconsole\login.html
public\mgmt\ConsoleXYZ\1.9\Help\zh_TW\net_rconsole\map.jhm
public\mgmt\ConsoleXYZ\1.9\Help\zh_TW\net_rconsole\messages.html
public\mgmt\ConsoleXYZ\1.9\Help\zh_TW\net_rconsole\notaproxy.html
public\mgmt\ConsoleXYZ\1.9\Help\zh_TW\net_rconsole\stprticn.gif
public\mgmt\ConsoleXYZ\1.9\Help\zh_TW\net_rconsole\toc.xml
public\mgmt\ConsoleXYZ\1.9\Help\zh_TW\net_rconsole\unknown.html
public\mgmt\ConsoleXYZ\1.9\Help\zh_TW\net_rconsole\webicn.gif
public\mgmt\ConsoleXYZ\1.9\Help\zh_TW\net_wanman\editwanmanpolicy.htm
public\mgmt\ConsoleXYZ\1.9\Help\zh_TW\net_wanman\lanareacost.htm
public\mgmt\ConsoleXYZ\1.9\Help\zh_TW\net_wanman\lanareaident.htm
USERS\JOHNN\ACCESS\DISK4\VER.DL_
USERS\JOHNN\ACCESS\DISK4\VSHARE.38_
USERS\JOHNN\ACCESS\DISK4\CONSTANT.TX_
USERS\JOHNN\ACCESS\DISK4\DRVACC2.HL_
USERS\JOHNN\ACCESS\DISK4\MSACC20.H1_
USERS\JOHNN\ACCESS\DISK4\MSACCPSS.HL_
USERS\JOHNN\ACCESS\DISK4\MSAFIN.DL_
USERS\JOHNN\ACCESS\DISK4\MSAU200.DL_
USERS\JOHNN\ACCESS\DISK4\MSINFO.EX_
USERS\JOHNN\ACCESS\DISK4\MSJETERR.DL_
USERS\JOHNN\ACCESS\DISK4\MSJETINT.DL_
USERS\JOHNN\ACCESS\DISK4\MSTOOLBR.DL_
USERS\JOHNN\ACCESS\DISK4\ODBCTL16.DL_
USERS\JOHNN\ACCESS\DISK4\OLE2CONV.DL_
USERS\JOHNN\ACCESS\DISK4\OLE2NLS.DL_
USERS\JOHNN\ACCESS\DISK4\OLE2PROX.DL_
USERS\JOHNN\ACCESS\DISK4\ORDERS.MD_
USERS\JOHNN\ACCESS\DISK4\SOA200.DL_
USERS\JOHNN\ACCESS\DISK5\MAPIVIM.DL_
USERS\JOHNN\ACCESS\DISK5\MSACC20.H2_
USERS\JOHNN\ACCESS\DISK5\MSACCESS.CU_
USERS\JOHNN\ACCESS\DISK5\ORDERS.HL_
```

Tape # 2

```
DEPT\PILOTS\First Projects\BP Project\Map5.bmp
DEPT\PILOTS\First Projects\BP Project\Map6.bmp
DEPT\PILOTS\First Projects\BP Project\Map7.bmp
DEPT\PILOTS\First Projects\BP Project\Map8.bmp
DEPT\PILOTS\First Projects\BP Project\MapGOM.cdr
DEPT\PILOTS\First Projects\BP Project\MapGOM.EMF
DEPT\PILOTS\First Projects\BP Project\Platform.bmp
DEPT\PILOTS\First Projects\BP Project\Presentation1.ppt
DEPT\PILOTS\First Projects\BP Project\Secimec Boat.BMP
DEPT\PILOTS\First Projects\BP Project\Ship.bmp
DEPT\PILOTS\First Projects\BP Project\Thumbs.db
DEPT\PILOTS\First Projects\BP pictures\Ford picture.doc
DEPT\PILOTS\First Projects\BP pictures\Ira x99 with rig.doc
DEPT\PILOTS\First Projects\BP pictures\x99 departing rig.doc
DEPT\PILOTS\First Projects\BP pictures\x99 landing offshore.doc
DEPT\PILOTS\First Projects\Range Vs Payload XY999\01-02 Payload versus Range for ERA.xls
DEPT\PILOTS\First Projects\Range Vs Payload XY999\01-02-07 Payload versus Range for ERA.ppt
DEPT\PILOTS\First Projects\Range Vs Payload XY999\01-02-07 Payload versus Range for ERA.xls
DEPT\PILOTS\First Projects\Range Vs Payload XY999\New Payload Vs Range, 999,999,a++,c+(proposed).xls
DEPT\PILOTS\First Projects\Range Vs Payload XY999\New Payload Vs Range, 999,999,a++,c+.xls
DEPT\PILOTS\First Projects\Range Vs Payload XY999\Payload Vs Range ,999,999,99A++,99C+(Proposed).doc
DEPT\PILOTS\First Projects\Range Vs Payload XY999\Payload Vs Range ,999,999,99A++,99C+.doc
DEPT\PILOTS\First Projects\Range Vs Payload XY999\Payload Vs Range XY999,BH999,S99A++,S99C+,1-2-03.xls
DEPT\PILOTS\First Projects\Range Vs Payload XY999\Payload Vs Range XY999,BH999,S99A++,S99C+.xls
DEPT\PILOTS\First Projects\Range Vs Payload XY999\Payload Vs Range s22,ab1234, s11, 1-2-03.xls
DEPT\PILOTS\First Projects\Range Vs Payload XY999\Payload Vs Range s22,ab1234, s11.xls
DEPT\PILOTS\First Projects\Range Vs Payload XY999\Payload Vs Range.ppt
DEPT\PILOTS\First Projects\Range Vs Payload XY999\Payload Vs Range.xls
DEPT\PILOTS\First Projects\Range Vs Payload XY999\Thumbs.db
DEPT\PILOTS\First Projects\Range Vs Payload XY999\work Payload Vs Range.xls
DEPT\PILOTS\ZDISK\Paper\DATA\DeskTop\TX new hire\2002\Critiques\Bookman, Bob\MaxDesk.ini
DEPT\PILOTS\ZDISK\Paper\DATA\DeskTop\TX new hire\2002\Critiques\Bookman, Bob\pilot
```

TABLE 1-continued

```
info.max
  DEPT\PILOTS\ZDISK\Paper\DATA\DeskTop\TX new hire\2002\Critiques\Bookman,
Bob\PPThumbs.ptn
  DEPT\PILOTS\ZDISK\Paper\DATA\DeskTop\TX new hire\2002\Critiques\Brook, Joe W\All.max
  DEPT\PILOTS\ZDISK\Paper\DATA\DeskTop\TX new hire\2002\Critiques\Brook, Joe W\exams.max
  DEPT\PILOTS\ZDISK\Paper\DATA\DeskTop\TX new hire\2002\Critiques\Brook, Joe
W\MaxDesk.ini
  DEPT\PILOTS\ZDISK\Paper\DATA\DeskTop\TX new hire\2002\Critiques\Brook, Joe W\pilot
info.max
  DEPT\PILOTS\ZDISK\Paper\DATA\DeskTop\TX new hire\2002\Critiques\Brook, Joe
W\PPThumbs.ptn
  DEPT\PILOTS\ZDISK\Paper\DATA\DeskTop\TX new hire\2002\Critiques\Moore, Mike\All.max
  DEPT\PILOTS\ZDISK\Paper\DATA\DeskTop\TX new hire\2002\Critiques\Moore, Mike\exams.max
  DEPT\PILOTS\ZDISK\Paper\DATA\DeskTop\TX new hire\2002\Critiques\Moore,
Mike\MaxDesk.ini
  DEPT\PILOTS\ZDISK\Paper\DATA\DeskTop\TX new hire\2002\Critiques\Moore, Mike\pilot
info.max
  DEPT\PILOTS\ZDISK\Paper\DATA\DeskTop\TX new hire\2002\Critiques\Moore,
Mike\PPThumbs.ptn
  DEPT\PILOTS\ZDISK\Paper\DATA\DeskTop\TX new hire\2002\Critiques\Molder, Fox\All.max
  DEPT\PILOTS\ZDISK\Paper\DATA\DeskTop\TX new hire\2002\Critiques\Molder, Fox\exams.max
  DEPT\PILOTS\ZDISK\Paper\DATA\DeskTop\TX new hire\2002\Critiques\Molder,
Fox\MaxDesk.ini
  ZDISK\Training\PP\DATA\DeskTop\PILOT RECORDS\DOE, JOHN\BH-999\March 28, 2000 (99).max
  ZDISK\Training\PP\DATA\DeskTop\PILOT RECORDS\DOE, JOHN\BH-999\MAXDESK.INI
  ZDISK\Training\PP\DATA\DeskTop\PILOT RECORDS\DOE, JOHN\BH-999\PPThumbs.ptn
  ZDISK\Training\PP\DATA\DeskTop\PILOT RECORDS\DOE, JOHN\BO-999\PPThumbs.ptn
  ZDISK\Training\PP\DATA\DeskTop\PILOT RECORDS\DOE, JOHN\CHECK AIR\09-09-00-S99.max
  ZDISK\Training\PP\DATA\DeskTop\PILOT RECORDS\DOE, JOHN\CHECK AIR\09-09-99.max
  ZDISK\Training\PP\DATA\DeskTop\PILOT RECORDS\DOE, JOHN\CHECK AIR\Jan 26, 2000 (1).max
  ZDISK\Training\PP\DATA\DeskTop\PILOT RECORDS\DOE, JOHN\CHECK AIR\Jan 5, 2000 (2).max
  ZDISK\Training\PP\DATA\DeskTop\PILOT RECORDS\DOE, JOHN\CHECK AIR\Jan 7, 2000 (3).max
  ZDISK\Training\PP\DATA\DeskTop\PILOT RECORDS\DOE, JOHN\CHECK AIR\Feb 19, 2000 (4).max
  ZDISK\Training\PP\DATA\DeskTop\PILOT RECORDS\DOE, JOHN\CHECK AIR\May 20, 1999 (5).max
  ZDISK\Training\PP\DATA\DeskTop\PILOT RECORDS\DOE, JOHN\CHECK AIR\May 20, 1999 (6).max
  ZDISK\Training\PP\DATA\DeskTop\PILOT RECORDS\DOE, JOHN\CHECK AIR\May 20, 1999 (7).max
  ZDISK\Training\PP\DATA\DeskTop\PILOT RECORDS\DOE, JOHN\CHECK AIR\May 20, 1999 (8).max
  ZDISK\Training\PP\DATA\DeskTop\PILOT RECORDS\DOE, JOHN\CHECK AIR\May 20, 1999 (9).max
  ZDISK\Training\PP\DATA\DeskTop\PILOT RECORDS\DOE, JOHN\CHECK AIR\May 20, 1999 (10).max
  ZDISK\Training\PP\DATA\DeskTop\PILOT RECORDS\DOE, JOHN\CHECK AIR\May 20, 1999 (11).max
  ZDISK\Training\PP\DATA\DeskTop\PILOT RECORDS\DOE, JOHN\CHECK AIR\May 20, 1999 (12).max
  ZDISK\Training\PP\DATA\Desktop\PILOT RECORDS\DOE, JOHN\CHECK AIR\MAXDESK.INI
  LCH-
DMS$\PixTools\Toolkits\SUPPORT\NT4SP3\DRIVERS\SUPPORT\DR3080.PXN\SYSDIR\rmslant.dll
  LCH-DMS$\PixTools\Toolkits\SUPPORT\NT4SP3\DRIVERS\SUPPORT\DR4580.PXN\PIXSCAN.INS
  LCH-DMS$\PixTools\Toolkits\SUPPORT\NT4SP3\DRIVERS\SUPPORT\DR5060.PXN\PIXSCAN.INS
  LCH-
DMS$\PixTools\Toolkits\SUPPORT\NT4SP3\DRIVERS\SUPPORT\DR5060.PXN\PIXTRAN\dr5060.loc
  LCH-DMS$\PixTools\Toolkits\SUPPORT\NT4SP3\DRIVERS\SUPPORT\DS3590MS.PXN\PIXSCAN.INS
  LCH-DMS$\PixTools\Toolkits\SUPPORT\NT4SP3\DRIVERS\SUPPORT\DSSCAN.PXN\PIXSCAN.INS
  LCH-DMS$\PixTools\Toolkits\SUPPORT\NT4SP3\DRIVERS\SUPPORT\EKDS3520.PXN\PIXSCAN.INS
  LCH-DMS$\PixTools\Toolkits\SUPPORT\NT4SP3\DRIVERS\SUPPORT\EKDS4500.PXN\PIXSCAN.INS
  LCH-DMS$\PixTools\Toolkits\SUPPORT\NT4SP3\DRIVERS\SUPPORT\EKDS4500.PXN\SYSDIR\thr.dll
  LCH-DMS$\PixTools\Toolkits\SUPPORT\NT4SP3\DRIVERS\SUPPORT\EKDS450B.PXN\PIXSCAN.INS
  LCH-DMS$\PixTools\Toolkits\SUPPORT\NT4SP3\DRIVERS\SUPPORT\EKDS450B.PXN\SYSDIR\thr.dll
  LCH-DMS$\PixTools\Toolkits\SUPPORT\NT4SP3\DRIVERS\SUPPORT\EKI50I60.PXN\PIXSCAN.INS
  LCH-DMS$\PixTools\Toolkits\SUPPORT\NT4SP3\DRIVERS\SUPPORT\F3091.PXN\PIXSCAN.INS
  LCH-DMS$\PixTools\Toolkits\SUPPORT\NT4SP3\DRIVERS\SUPPORT\FCPA.PXN\PIXSCAN.INS
  LCH-DMS$\PixTools\Toolkits\SUPPORT\NT4SP3\DRIVERS\SUPPORT\FCPA.PXN\SYSDIR\Avaspi32.dll
  LCH-DMS$\PixTools\Toolkits\SUPPORT\NT4SP3\DRIVERS\SUPPORT\KVS2025.PXN\PIXSCAN.INS
  LCH-DMS$\PixTools\Toolkits\SUPPORT\NT4SP3\DRIVERS\SUPPORT\KVSS.PXN\PIXSCAN.INS
  LCH-DMS$\PixTools\Toolkits\SUPPORT\NT4SP3\DRIVERS\SUPPORT\KVSS.PXN\PIXTRAN\KVSS.LOC
  LCH-DMS$\PixTools\Toolkits\SUPPORT\NT4SP3\DRIVERS\SUPPORT\KVSSCAN.PXN\PIXSCAN.INS
  LCH-DMS$\PixTools\Toolkits\SUPPORT\NT4SP3\DRIVERS\SUPPORT\M4097.PXN\PIXSCAN.INS
  LCH-DMS$\PixTools\Toolkits\SUPPORT\NT4SP3\DRIVERS\SUPPORT\M4097.PXN\PIXTRAN\m4097.loc
  LCH-DMS$\PixTools\Toolkits\SUPPORT\NT4SP3\DRIVERS\SUPPORT\M4340.PXN\PIXSCAN.INS
  LCH-DMS$\PixTools\Toolkits\SUPPORT\NT4SP3\DRIVERS\SUPPORT\M4340.PXN\SYSDIR\MSVCP60.DLL
  LCH-DMS$\PixTools\Toolkits\SUPPORT\NT4SP3\DRIVERS\SUPPORT\M4750.PXN\PIXSCAN.INS
  LCH-DMS$\PixTools\Toolkits\SUPPORT\NT4SP3\DRIVERS\SUPPORT\M4750L.PXN\PIXSCAN.INS
  LCH-DMS$\PixTools\Toolkits\SUPPORT\NT4SP3\DRIVERS\SUPPORT\M4860.PXN\PIXSCAN.INS
  drafting\Raster Images\Era Drawings\Garden\Garden-09.bmp
  drafting\Raster Images\Tank\buckeye-side-view.bmp
  drafting\Raster Images\Tank\buckeye-side-view2.bmp
  drafting\Raster Images\Tank\buckeye-side-view3.bmp
  drafting\Raster Images\Tank\buckeye-side-view4.bmp
  drafting\Raster Images\Tank\buckeye-side-view5.bmp
  drafting\Raster Images\Tank\buckeye-side-view6.bmp
  drafting\Raster Images\Tank\buckeye-side-view7.bmp
  drafting\Raster Images\Tank\buckeye-side-view8.bmp
  drafting\Raster Images\Tank\cover.bmp
```

TABLE 1-continued

```
drafting\Raster Images\Tank\cover.jpg
drafting\Raster Images\Tank\cover2.bmp
drafting\Raster Images\Tank\cover2.jpg
drafting\Raster Images\Tank\cover3.bmp
drafting\Raster Images\Tank\cover3.jpg
drafting\Raster Images\Tank\cover4.bmp
drafting\Raster Images\Tank\cover4.jpg
drafting\Raster Images\Tank\DESCRIPTION.bmp
drafting\Raster Images\Tank\dump b&w.bmp
drafting\Raster Images\Tank\dump b&w2.bmp
drafting\Raster Images\Tank\dump b&w3.bmp
drafting\Raster Images\Tank\Era Control.bmp
drafting\Raster Images\Tank\Era Control2.bmp
drafting\Raster Images\Tank\FIG-INDEX.bmp
drafting\Raster Images\Tank\glareshield-mounted-panel.bmp
```

In one embodiment, a total term counter is initially set to zero. In one embodiment, if a term identified in the file path at step 311 is a new term (see step 312), it is counted once and added to a candidate list at step 313. A candidate list is a list of unique terms identified and extracted from file paths of members of the media pool. The total number of terms on the candidate list is increased by one at step 318 and checked against a preset goal (e.g., 1000 terms) at step 319. If the term identified at the file path at step 311 is not a new term (see step 312), then that term's count is increased by one at step 314 and compared with a predetermined threshold (e.g., 10 repeats). In one embodiment, once a term has been found to repeat the same as or more times than the predetermined threshold at step 315, it may be added to a working list of common terms at step 317 if it is not already on the working list (step 316). A working list is a list of repeat terms, each exceeding the predetermined threshold (e.g., 10 or more repeats). Each time a term is extracted, be it a new term or a repeat, the term total is increased by one (step 318). At step 319, if the term total does not meet the predetermined goal (e.g., 1000 terms), the next term from the file path is extracted and analyzed at step 311. If there are no more terms that can be extracted from the file path, the next file or item is read from the storage medium and its file path scanned for terms at step 310. One of ordinary skill in the art will appreciate that the preset goal can be any number and thus is not limited to 1000. Similarly, the predetermined threshold can be any number of repeats and is not limited to 10. As will be explained below with reference to FIG. 5, the values for the goal and the threshold can be independently configured and adjusted based on a variety of factors, including the size of a job, average number of files or items stored on each storage medium, etc. Once the preset goal is reached (e.g., 1000 terms are extracted and counted), this portion of the profile building phase is complete and the next phase begins at step 302.

Referring to FIG. 5, flow diagram 350 shows one embodiment of a term threshold analysis phase. In one embodiment, if the threshold does not need adjustment, all of the terms on the working list described above with reference to FIG. 4 are moved to a master list of common terms at step 323. As terms are added to the candidate list and the repeat counts (frequency) go up (hence increasing the size of the working list), the threshold for membership of the master list is adjusted. Step 320 through step 323 can programmatically determine whether the threshold needs to be adjusted and the amount of adjustment, among others. The decision on the need for threshold adjustment can be configured to dynamically depend on whether a first term having the highest frequency is double (or some other desired factor or ratio) the frequency of a second term having the lowest frequency on the candidate list (step 320). In this case, the threshold for a term being on the master list can be set to the frequency value at the midpoint between the lowest frequency count and the highest frequency count (step 321). Once a new threshold is set, the master list is updated accordingly at step 322. In this embodiment, only terms that have corresponding counter values equal to or more than the new threshold are moved to the master list. In one embodiment, this threshold adjustment can be reevaluated every time the predetermined goal is reached. It should be understood that this is simply one exemplary embodiment of the term threshold analysis phase. There is no maximum as to the number of members that can be on the master list. Other threshold adjustment methodologies can be substituted into various embodiments of the invention.

Once the master list is compiled, it can represent a unique profile or "fingerprint" for the given media pool. The lists (i.e., candidate list, working list, and master list) can be continuously revised as each storage medium of a given media pool is read. If the media pool represents a subset of one or more media pools, the lists can be reused for other media pools that may be of a different media type and/or format.

Flow diagram 375 of FIG. 5 (starting at stage 303) shows one embodiment of how the master list is utilized to validate/invalidate incoming media. In this embodiment, flow diagram 375 can be characterized as the final media validation phase comprising steps 330-337. As shown in FIG. 5, the next file of a storage medium is read at step 330 and its path components or terms are extracted and placed on a working list at step 331. The working list is compared to the master list at step 332. The media processing tool can be configured to determine the validity of a storage medium based on a percentage of terms on the working list that can be found on the master list. As an example, at step 333, the media processing tool may operate to determine that, if at least half (50%) of the terms recorded on the working list (and hence are contained on that particular storage medium) are also on the master list, then that particular storage medium is considered valid. In which case, at step 336, any new terms found from the storage medium are added to the candidate list and counts for the repeated terms are updated accordingly. If the storage medium fails at step 333 (i.e., it does not fit (e.g., less than 50%) the profile of the particular media pool represented by the corresponding master list), the media processing is suspended at step 334 and a human user may optionally be asked to verify the validity of the storage medium. If the validity of the storage medium is confirmed at step 335, it is processed as normal and the associated lists are updated accordingly at step 336 to add new terms and count repeated terms as described above. Steps 330-337 can be repeated until the last file or item is processed (or alternatively some number less than all files as configured by a user). Once the last file or item from the storage medium is processed, then phase 303 is completed at step 337 and the media processing tool proceeds to process the next storage medium or concludes the job (step 160).

In one embodiment, if the storage medium can not be validated at step 335, it is ejected and the media processing tool proceeds to process the next storage medium. In one embodiment, if the storage medium can not be validated at step 335, then all of the data (e.g., files) that are thus far processed from that invalid storage medium can be marked as invalid and removed from the job. In one embodiment, this can be done by utilizing the global media identifier that is associated with content from that storage medium (e.g., a volume ID or other equivalent identifier) to flag the content as invalid. Flagged invalid content can be purged from the processing system during a garbage collection cycle. In one embodiment, marking and purging invalid content can be done as part of step 335. In addition, all of the counts and new terms from the invalid storage medium may be removed from the candidate and master lists at step 335. The media processing tool then proceeds to process the next storage medium or concludes the job (step 160).

Figure 6:
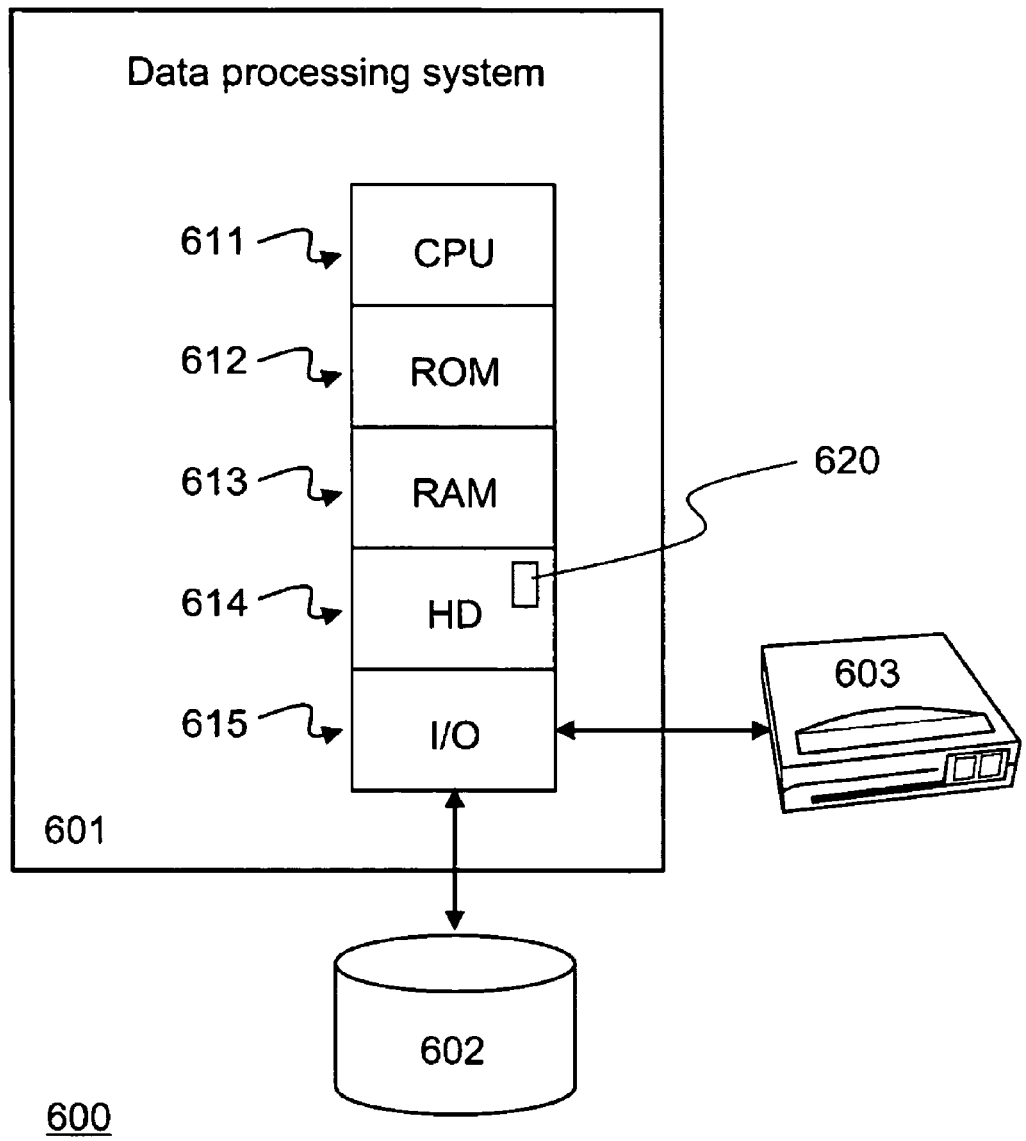
FIG. 6 is a schematic drawing illustrating a data processing system programmed with computer-executable program instructions embodied on a computer-readable medium, the computer-executable program instructions implementing the first, second, and third methods disclosed herein in accordance with embodiments of the invention.

FIG. 6 is a schematic drawing illustrating an exemplary data processing system architecture 600 implementing embodiments of the invention disclosed herein. In this example, data processing system architecture 600 includes an exemplary computer 601 having central processing unit (CPU) 611, read-only memory (ROM) 612, random access memory (RAM) 613, hard drive (HD) or storage memory 614, and input/output device(s) (I/O) 615. I/O 615 can include a keyboard, monitor, printer, electronic pointing device such as mouse, trackball, stylus, and the like. Data processing system architecture 600 may include database(s) or other types of data repositories 602 connected to computer 601. In this example, ROM 612, RAM 613, HD 614, and repository 613 can include media that can be read by CPU 611, i.e., each of these types of computer memories includes a computer-readable medium. These memories may be internal or external to computer 601.

In this example, HD 614 is programmed with computer-executable program instructions embodied on a computer-readable medium 620. These computer-executable program instructions, when executed by CPU 611, can implement the methods disclosed herein with reference to FIGS. 1-5. For example, the computer-executable program instructions may include software code for implementing one embodiment of a media processing tool described herein. During operation of data processing system 600, all or a portion of the software code implementing the media processing tool may be copied to RAM 613. The media processing tool, when executed by CPU 611, operates to read storage medium 603 via I/O 615, which is in communication with an external or internal data drive (not shown) into which storage medium 603 is loaded for a data recovery job. Note that FIG. 6 is a simplification of an exemplary system configuration. Many other alternative system configurations, including wired and wireless networks, as well as programming languages and techniques are possible and known to those skilled in the art.

Although the present invention has been described and illustrated in detail, it should be understood that the embodiments and drawings are not meant to be limiting. Various alterations and modifications are possible without departing from the spirit and scope of the invention. Accordingly, the scope of the invention should be determined by the following claims and their legal equivalents.

What is claimed is:

1. A computer-implemented method for detecting incorrect media in a data recovery operation, utilizing a data processing system, comprising a processor and a storage device, the method comprising the steps of:
compiling a master profile for identifying certain members of a set of media associated with the data recovery operation, wherein the step of compiling a master profile further comprises the steps of;
reading an item from a member of the set of media;
extracting one or more terms from a file path of the item;
determining whether the one or more terms are on a first list;
adding new terms that are not on the first list to the first list;
counting repeated terms that are on the first list;
determining whether corresponding counters of the repeated terms meet or exceed a threshold;
determining whether terms having corresponding counters that meet or exceed the threshold are on a second list; and
updating the second list accordingly;
generating individual profiles for certain potential members of the set of media;
updating a term total counter according to an amount of the one or more terms extracted from the file path;
determining whether the term total meets a predetermined goal; and
moving terms having corresponding counters that meet or exceed the threshold to a third list which defines the master profile;
comparing certain of said individual profiles with said master profile by utilizing said processor, to execute a) a first test for determining physical characteristics for said certain potential members of said set of media, b) a second test for a unique identifier accorded certain of said potential members of said set of media, and c) a third test for determining unique content indication associated with certain potential members of said set of media; and
based on said comparing step, validating or invalidating said certain potential members of said set of media.

2. The method for detecting incorrect media in a data recovery job utilizing a data processing system comprising a processor and a computer-readable medium of claim 1, wherein the step of compiling a master profile, further comprises dynamically adjusting said threshold.

3. The method for detecting incorrect media in a data recovery job utilizing a data processing system comprising a processor and a computer-readable medium of claim 1, wherein the step of compiling individual profiles comprises determining a percentage of a first set of terms matching a second set of terms on said third list, wherein said first set of terms are extracted from a file path of a second item representing an individual profile of a potential member of said set of media.

4. A non-transitory computer readable medium with software instructions for executing operations via a processor associated with the non-transitory computer readable medium, the operations for detecting incorrect media in a data recovery process, the operations comprising:
determining whether a first media identification and a second media identification match, wherein said first media identification is electronically stored and associated with a physical label identifying a storage medium and wherein said second media identification is associated with an electronic header of said storage medium;

if said first media identification and said second media identification match, determining whether said storage medium is a member of a set of media associated with said data recovery operation;
reading an item from said storage medium and scanning a file path of said item and extracting one or more terms from said file path; and
compiling a master profile for identifying certain members of the set of media associated with the data recovery operation, wherein the step of compiling a master profile further comprises the steps of;
reading an item from a member of the set of media;
extracting one or more terms from a file path of the item;
determining whether the one or more terms are on a first list;
adding new terms that are not on the first list to the first list;
counting repeated terms that are on the first list;
determining whether corresponding counters of the repeated terms meet or exceed a threshold;
determining whether terms having corresponding counters that meet or exceed the threshold are on a second list; and
updating the second list accordingly;
generating individual profiles for certain potential members of the set of media;
updating a term total counter according to an amount of the one or more terms extracted from the file path;
determining whether the term total meets a predetermined goal; and
moving terms having corresponding counters that meet or exceed the threshold to a third list which defines the master profile.

5. The non-transitory computer readable medium as defined in claim 4, wherein the non-transitory computer readable medium further comprises software instructions for performing the following the steps of:
if said first media identification and said second media identification do not match, requesting a human inspection;
if said storage medium is validated by said human inspection, updating said set of media to include said storage medium as a member; and
if said storage medium is invalidated by said human inspection, ejecting said storage medium.

6. The non-transitory computer readable medium as defined in claim 4, wherein the non-transitory computer readable medium further comprises a software instruction for electronically scanning said physical label to obtain said first media identification.

7. The non-transitory computer readable medium as defined in claim 4, wherein the non-transitory computer readable medium further comprises a software instruction for analyzing an electronic header of said storage medium to obtain said second media identification.

8. The non-transitory computer readable medium as defined in claim 4, wherein the terms comprise any one of file names, directories, servers, sources, resources, keywords.

9. The non-transitory computer readable medium as defined in claim 4, wherein the non-transitory computer readable medium further comprises an instruction for dynamically adjusting said threshold.

10. A computer system configured to detect incorrect media in a data recovery operation in a native and non-native environment, comprising:

a) a plurality of storage media;
b) a processor comprising a means for performing a first validation process, whereby the processor determines a computing environment for processing the plurality of storage media and performing an environmental check on each of the plurality of storage media, the processor further for validating or invalidating each of the plurality of storage media based on a result of the environmental check;
c) the processor for each storage medium that passes the first validation process, comprising a means for performing a second validation process, whereby the means determines whether a first media identification and a second media identification match, wherein the first media identification is associated with a physical label identifying a storage medium and wherein the second media identification is associated with an electronic header of the storage medium and wherein, if the first media identification and the second media identification match, the processor determines whether the storage medium is a potential member of a set of media;
d) the processor for each potential member of the set of media that passes the second validation process, comprising instructions for performing the following steps:
compiling a master profile for identifying certain members of a set of media associated with the data operation, wherein the step of compiling a master profile further comprises the steps of;
reading an item from a member of the set of media;
extracting one or more terms from a file path of the item;
determining whether the one or more terms are on a first list;
adding new terms that are not on the first list to the first list;
counting repeated terms that are on the first list;
determining whether corresponding counters of the repeated terms meet or exceed a threshold;
determining whether terms having corresponding counters that meet or exceed the threshold are on a second list; and
updating the second list accordingly;
generating individual profiles for certain potential members of the set of media;
updating a term total counter according to an amount of the one or more terms extracted from the file path;
determining whether the term total meets a predetermined goal; and
moving terms having corresponding counters that meet or exceed the threshold to a third list, which defines the master profile;
comparing certain of the individual profiles with the master profile to execute a) a first test for determining physical characteristics for the certain potential members of the set of media, b) a second test for a unique identifier accorded certain of the potential members of the set of media, and c) a third test for determining unique content indication associated with certain potential members of the set of media; and
validating or invalidating the certain potential members of the set of media based on a comparison of the individual profiles with the master profile; and
e) the processor configured to eliminate the incorrect data, after the third validation process, in the event it is determined based on application of additional factors.

11. The computer system configured to detect incorrect media in a data recovery operation in a native and non-native environment, as defined in claim 10, wherein if the first media identification and the second media identification do not match, the computer system is configured to request a human inspection and if either one or more of the storage media is validated by the human inspection, the computer system is configured to update the set of media to include the storage media as a member and if the storage media is invalidated by the human inspection, the computer system is configured to eject the storage medium.

12. The computer system configured to detect incorrect media in a data recovery operation in a native and non-native environment, as defined in claim 10, wherein the computer system is configured to electronically scan the physical label to obtain the first media identification.

13. The computer system configured to detect incorrect media in a data recovery operation in a native and non-native environment, as defined in claim 10, wherein the computer system is configured to analyze an electronic header of each of the storage media to obtain the second media identification.

14. The computer system configured to detect incorrect media in a data recovery operation in a native and non-native environment, as defined in claim 10, wherein the terms comprise any one of file names, directories, servers, sources, resources, keywords.

15. The computer system configured to detect incorrect media in a data recovery operation in a native and non-native environment, as defined in claim 10, wherein the computer system has a mechanism for dynamically adjusting the threshold.

* * * * *